(12) United States Patent
Henry et al.

(10) Patent No.: US 11,319,849 B2
(45) Date of Patent: May 3, 2022

(54) TECHNOLOGIES FOR PRODUCING EXHAUST GAS WITH CONTROLLED HYDROCARBON SPECIATION

(71) Applicant: Southwest Research Institute, San Antonio, TX (US)

(72) Inventors: Cary A. Henry, Helotes, TX (US); Cynthia Chaffin Webb, San Antonio, TX (US); Scott T. Eakle, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 17/001,549

(22) Filed: Aug. 24, 2020

(65) Prior Publication Data

US 2021/0071556 A1  Mar. 11, 2021

Related U.S. Application Data

(62) Division of application No. 15/673,989, filed on Aug. 10, 2017, now Pat. No. 10,753,246.

(51) Int. Cl.
| | |
|---|---|
| *F01N 3/025* | (2006.01) |
| *F01N 9/00* | (2006.01) |
| *F01N 11/00* | (2006.01) |
| *F01N 3/30* | (2006.01) |

(52) U.S. Cl.
CPC ............. *F01N 3/0256* (2013.01); *F01N 3/30* (2013.01); *F01N 9/00* (2013.01); *F01N 11/00* (2013.01); *F01N 2240/02* (2013.01); *F01N 2240/14* (2013.01); *F01N 2270/04* (2013.01)

(58) Field of Classification Search
CPC .. F01N 11/00; F01N 2240/02; F01N 2240/14; F01N 3/30; F01N 3/0256; F01N 9/00
See application file for complete search history.

(56) References Cited

U.S. PATENT DOCUMENTS

| | | | |
|---|---|---|---|
| 5,284,016 A | * | 2/1994 | Stark ........................ F01N 9/00 60/303 |
| 5,315,824 A | | 5/1994 | Takeshima |
| 8,679,852 B2 | | 3/2014 | Webb et al. |

(Continued)

OTHER PUBLICATIONS

Jetter, J. & Honda R&D Americas, Inc.: LEV III Workshop, May 18, 2010, "Effect of Fuel Composition on PM Emissions" (16 pgs).

*Primary Examiner* — Anthony Ayala Delgado
(74) *Attorney, Agent, or Firm* — Grossman, Tucker, Perreault & Pfleger, PLLC

(57) ABSTRACT

Technologies for producing an exhaust gas stream with controlled hydrocarbon species are disclosed. In some embodiments the technologies include an apparatus for producing an exhaust gas stream. The apparatus may include a burner for combusting primary fuel and produce an exhaust gas stream, and an exhaust pipe coupled to the burner to receive the exhaust gas stream. One or more supplemental fuel inlets may be coupled to the exhaust gas pipe for the addition of supplemental fuel to the exhaust gas stream. In embodiments, the speciation and total concentration of hydrocarbon compounds in the exhaust gas stream may be adjusted by controlling the relative amount of supplemental fuel added to the exhaust gas stream. Methods for producing an exhaust gas stream are also disclosed.

18 Claims, 3 Drawing Sheets

(56) References Cited

U.S. PATENT DOCUMENTS

| | | | |
|---|---|---|---|
| 11,067,976 B2* | 7/2021 | Cella | G05B 23/0229 |
| 2002/0115030 A1 | 8/2002 | Koegl et al. | |
| 2005/0042763 A1* | 2/2005 | Anderson | F23D 11/107 |
| | | | 436/137 |
| 2011/0197569 A1* | 8/2011 | Salanta | F01N 3/206 |
| | | | 60/286 |
| 2012/0102919 A1 | 5/2012 | Smith et al. | |
| 2012/0252130 A1* | 10/2012 | Webb | G01M 15/102 |
| | | | 436/160 |

\* cited by examiner

TECHNOLOGIES FOR PRODUCING EXHAUST GAS WITH CONTROLLED HYDROCARBON SPECIATION

CROSS REFERENCE TO RELATED APPLICATIONS

This application is a divisional application of U.S. nonprovisional application Ser. No. 15/673,989, filed Aug. 10, 2017, now pending. the entire disclosure of which is incorporated herein by reference

FIELD

The present disclosure generally relates to technologies for producing exhaust gas with controlled hydrocarbon speciation. Systems for producing exhaust gas with controlled hydrocarbon speciation and methods utilizing such systems are disclosed.

BACKGROUND

Hydrocarbon emissions from internal combustion engines (e.g., diesel and gasoline engines) are a widely regulated pollutant. A wide variety of emissions control devices have been developed for the mitigation of such emissions. Many emissions control devices function to convert hydrocarbons within an exhaust stream (e.g., via oxidation or another mechanism) into more environmentally acceptable species. Although highly effective emissions control devices have been developed, it may be necessary to tailor the design of such a device to a particular internal combustion engine or, more particularly, to the exhaust stream produced by a particular engine.

Several characteristics of an exhaust gas stream (temperature, flow, hydrocarbon content, hydrocarbon speciation, etc.) may vary based on the operating characteristics of an engine or other hydrocarbon source. For example, an exhaust stream produced by an internal combustion engine may contain thousands of distinct hydrocarbon species. The overall concentration of hydrocarbons and the relative amount of different hydrocarbon species (i.e., different molecular weight) in an exhaust stream may differ when an engine is operated under a low load condition versus a high load condition. The various hydrocarbon species in an exhaust stream may react differently with the catalyst(s) used in an emissions control device. Design of an emissions control device therefore often involves evaluating the ability of a device design to mitigate hydrocarbon emissions at various engine operating states.

Numerous test systems and methods have been developed to test the ability of emissions control devices to treat hydrocarbons in an exhaust stream produced by internal combustion engines, such as but not limited to gasoline and diesel engines used in automobiles. Some existing test systems and methods are engine based, meaning that they utilize an actual internal combustion engine to generate a test exhaust gas that is used to test an emissions control device under consideration. Such systems can be expensive to operate, however, and can produce inconsistent results. They may also not allow the operator to dynamically control the overall amount (HC concentration) of hydrocarbon species and the composition of the hydrocarbon species in the test exhaust gas.

BRIEF DESCRIPTION OF THE DRAWINGS

The features of this disclosure and the manner of attaining them will become more apparent and better understood by reference to the following description of embodiments described herein taken in conjunction with the accompanying drawings, wherein.

DETAILED DESCRIPTION

Figure 1:
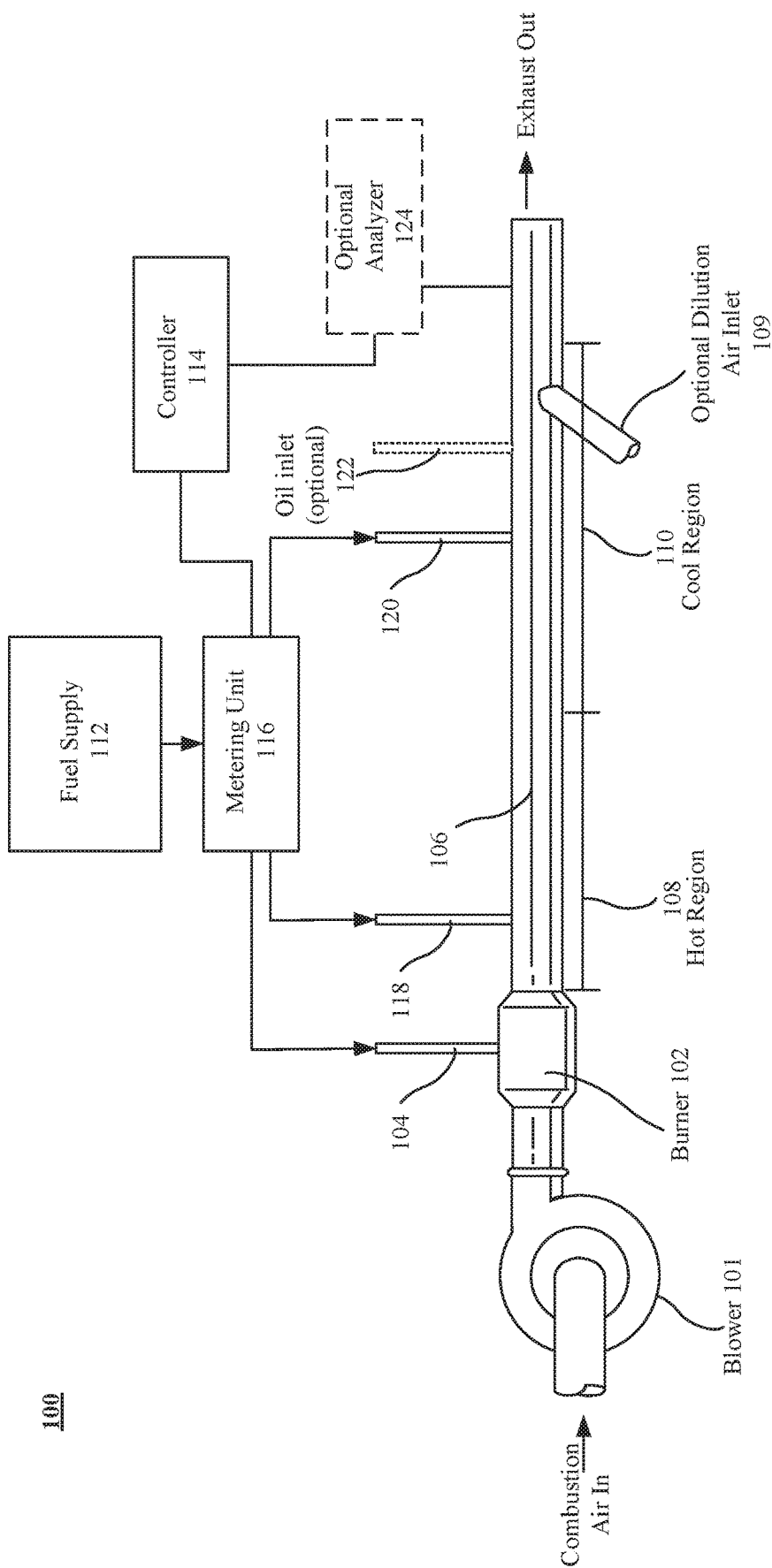
FIG. 1 is a burner-based exhaust generator consistent with the present disclosure.

The exhaust gas produced by an internal combustion engine (e.g., a diesel or gasoline engine) can contain a large variety of hydrocarbon compounds (species). The total concentration and speciation of the hydrocarbon compounds in the exhaust gas stream may vary depending on the operating conditions of the engine. Design of an emissions control device may therefore involve evaluating the ability of an emissions control device to mitigate hydrocarbon emissions at various engine operating states (e.g., lean, stoichiometric, or rich). Various test beds and methods have been developed for that purpose, and are employed to test emissions control devices using an exhaust gas stream that is produced by an engine or non-engine source. The type and concentration of hydrocarbons present in the exhaust stream produced by such systems is generally dictated by the type of fuel that is combusted at a chosen set of combustion conditions (e.g., air fuel ratio, fuel atomization, etc.). Thus for a particular fuel, the type and concentration of hydrocarbon species in the exhaust gas stream can be somewhat controlled by adjusting combustion conditions. The range of acceptable combustion conditions is practically limited, however, and thus may impose meaningful limits on the degree to which previous systems and methods may control hydrocarbon speciation and concentration in an exhaust gas stream. As a result, such systems and methods may be unsuitable for some applications. For example, some prior known test systems and methods may not be ideal for evaluating the performance of an emissions control device during a simulated transition between engine operating states.

The present disclosure generally relates to technologies for generating an exhaust gas stream with controlled hydrocarbon speciation. Such technologies include systems and methods that are particularly suitable for the testing of emissions control devices, but may also be used for other applications such as engine component HC fouling tests, exhaust gas recirculation (EGR) components evaluation, etc.

The terms "hydrocarbon speciation" and "hydrocarbon species" are interchangeably used herein to refer to the type of hydrocarbons within an exhaust gas stream. More particularly, such terms are used herein to generally refer to hydrocarbons that include a carbon chain of varying lengths. In embodiments, the hydrocarbon species described herein include a carbon chain that has a length ranging from greater than or equal to 2 carbons to less than or equal to about 30 carbons, such as greater than or equal to 2 carbons to less than or equal to about 20 carbons, greater than or equal to 2 carbons to less than or equal to about 15 carbons, or even greater than or equal to 2 carbons to less than or equal to about 12 carbons.

The term "short chain" is used herein to denote hydrocarbon species that include a hydrocarbon chain containing from 2 to 4 carbon atoms. In contrast the term "long-chain" is used herein to denote hydrocarbon species that contain 8 or more carbon atoms.

As used in any embodiment herein, the term "module" may refer to software, firmware, circuitry, or a combination thereof configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may, collectively or individually, be embodied as circuitry that forms a part of one or more controllers, as discussed below. In some embodiments one or more modules described herein may be in the form of logic that is implemented at least in part in hardware to perform one or more control (e.g., fuel metering) operations described herein.

The technologies described herein generally include or utilize a burner-based exhaust generator that includes a burner and an exhaust pipe downstream of the burner. The burner is configured to generate an exhaust stream by combusting a first (i.e., primary) fuel. The exhaust stream generated by combustion of the first fuel by the burner is conveyed into the exhaust pipe. A hot fuel inlet and a cool fuel inlet are coupled to the exhaust pipe. The hot fuel inlet is configured to deliver supplemental (e.g., secondary) fuel to a portion of the exhaust gas stream in the exhaust pipe that is relatively hot as the burner is operated, and the cool fuel inlet is configured to deliver supplemental (e.g., tertiary) fuel to a portion of the exhaust gas stream in the exhaust pipe that is relatively cool as the burner is operated.

The total hydrocarbon concentration and speciation of hydrocarbons in the exhaust gas stream may be controlled by controlling the type and/or relative amount of supplemental fuel added into the exhaust gas stream via the hot and cool fuel inlets, respectively. In embodiments the exhaust generator further includes a metering unit that is configured to control the type and/or amount of supplemental fuel that is supplied to the burner and the hot and cool fuel inlets, so as to adjust the composition of the exhaust gas stream such that it is within a threshold range of a target hydrocarbon speciation profile (THSP) and/or a target total hydrocarbon concentration (TTHC). The exhaust gas generator may also include a controller that is configured to generate control signals that cause the metering unit to meter primary, secondary, and/or tertiary fuel to one or more of the burner fuel inlet, hot fuel inlet, and/or cool fuel inlet, so as to achieve an exhaust gas stream that includes hydrocarbons within a threshold range of a THSP and/or TTHC.

FIG. 1 illustrates one example of a burner-based exhaust gas generator consistent with the present disclosure. Exhaust gas generator 100 is generally configured to generate an exhaust gas stream that includes hydrocarbons, wherein the total hydrocarbon concentration (THC) and/or the speciation of hydrocarbons (HS) in the exhaust gas stream is controlled. In embodiments exhaust gas generator 100 is configured to enable control over the HS and/or THC of the exhaust gas stream downstream of a burner. And in some embodiments exhaust gas generator 100 is further configured to enable dynamic control over the HS and/or THC of hydrocarbons in the exhaust gas stream, thereby allowing the generation of an exhaust gas stream that can accurately represent the true components of an exhaust gas stream produced by an engine (e.g., a gas or diesel engine) at a steady state or transient condition (i.e. a transition between operating states).

In the embodiment of FIG. 1, exhaust gas generator 100 includes a blower 101, a burner 102, a fuel line 104, an exhaust pipe 106, a controller 114, a metering unit 116, and supplemental fuel inlets 118, 120. Exhaust gas generator 100 may also optionally include a dilution air inlet 108, fuel supply 112, oil injector 122, and exhaust analyzer 124. As will be described in detail later, control over hydrocarbon speciation and/or total hydrocarbon concentration in the exhaust gas stream produced by exhaust gas generator 100 may be attained by metering additional (supplemental) fuel into one or more regions of exhaust pipe 106 that are downstream of burner 102, e.g., using one or more supplemental fuel inlets 118, 120. More specifically, the HS and/or THC of the exhaust gas stream may be controlled by metering controlled amounts of supplemental fuel into the exhaust gas stream at one or more locations along exhaust gas pipe 106.

Blower 101 generally functions to draw ambient air and to exhaust a pressurized stream of air for provision to a proximal end (air inlet) of burner 102. The volume of air supplied blower 30 may vary widely, and may be controlled electronically or in any other suitable manner (e.g., by one or more mechanical valves, not shown).

Burner 102 generally functions to combust a first fuel (hereinafter, "primary fuel") supplied at a specified fuel/air ratio (stoichiometry). Primary fuel may be supplied to burner 102 via burner fuel inlet 104. In the illustrated embodiment, burner fuel inlet 104 is depicted as being coupled to metering unit 116, which may be configured to dispense primary fuel from optional fuel supply 112 (or another source), e.g., in response to control signals issued by controller 114. It should be understood that such illustration is for the sake of example only, and that burner fuel inlet 104 need not be connected to metering unit 116. For example, in some embodiments burner fuel inlet 104 may be coupled directly to optional fuel supply 112 or another fuel source. In such instances the amount of fuel provided to burner 102 may be controlled in any suitable fashion, e.g., manually, via one or more mechanical valves, under the control of a controller (not shown) that is discrete from controller 114, etc. In any case, one or more fuel pumps (not shown) may be fluidly coupled to burner fuel inlet 104 and configured to facilitate the provision of primary fuel to burner 102 (e.g., to a fuel nozzle within burner 102, not shown).

Burner 102 may be configured to combust various types of primary fuels. Non-limiting examples of primary fuels that may be used include gasoline, synthetic gasoline, diesel, biodiesel, liquefied fuel produced from coal, peat, or similar materials, ethanol, methanol, compressed natural gas, liquefied petroleum gas, kerosene, propane, combinations thereof, and the like. In some embodiments burner 102 is configured to combust fuels that are frequently used in automobiles, such as but not limited to gasoline, diesel, compressed natural gas, or propane.

A wide variety of burners may be used as burner 102. One non-limiting example of a burner that is suitable for use as burner 102 is a swirl stabilized burner that is capable of producing continuous combustion at using various fuel:air ratios, such as lean, stoichiometric, or rich fuel:air ratios. Such a burner may have a plenum chamber and a combustion tube, divided by a swirl plate that is equipped with a fuel injector (not shown). Air from blower 101 may be introduced into the plenum chamber, through the swirl plate, and into the burner tube. Primary fuel (e.g., from fuel supply 112) may be conveyed via burner fuel inlet 104 to the fuel injector in the swirl plate. The fuel injector is configured to inject primary fuel into the burner tube so as to create a mixture of primary fuel and air at a specified fuel:air ratio. The primary fuel:air mixture may then be ignited with the aid of one or more spark igniters or any other suitable ignition device.

Exhaust gas pipe 106 is fluidly coupled to burner 102 and is configured to receive an exhaust gas stream produced by the combustion of primary fuel by burner 102. Without further modification the exhaust gas stream will have a total hydrocarbon concentration and a hydrocarbon speciation profile that may be dictated by the combustion conditions (fuel:air ratio), the type of primary fuel that is combusted in burner 102, and chemical reactions (e.g., oxidation) that take place as the exhaust gas stream passes through exhaust pipe 106.

The inventors have discovered that the total hydrocarbon concentration and/or hydrocarbon species in an exhaust gas stream may be adjusted by adding additional hydrocarbon fuel (hereinafter, "supplemental fuel," "secondary fuel," or "tertiary fuel") into the exhaust gas stream at one or more points along exhaust pipe 106. In particular, the inventors have discovered that adding supplemental fuel into a portion of exhaust pipe 106 that is directly downstream of burner 102 (i.e., where the exhaust gas stream is relatively hot) results in partial oxidation of the secondary fuel, which in turn increases the concentration of short chain hydrocarbon species within the exhaust gas stream. In contrast, the addition of supplemental fuel into the exhaust gas stream at a point that is further downstream of burner 102 (i.e., where the exhaust gas is relatively cool) results in vaporization but little or no oxidation of the secondary fuel, thus increasing the concentration of long chain hydrocarbon species in the exhaust gas stream. Therefore by metering secondary fuel into a relatively cool region of the exhaust gas stream, the hydrocarbon speciation in the exhaust gas stream will be adjusted towards the hydrocarbon speciation of the raw secondary fuel.

As used herein, the terms "supplemental fuel," "secondary fuel" and "tertiary fuel" are used merely to identify fuel that is added into an exhaust gas stream at subsequent to combustion of a primary fuel. Supplemental fuel may be added, for example to an exhaust gas stream that is flowing through an exhaust pipe, such as exhaust pipe 106. Such terms are used in contradistinction to the term, "primary fuel," which refers to fuel that is supplied to a burner for combustion, e.g., burner 102. It should be understood that primary fuel, secondary fuel, and tertiary fuel may be the same or different type of fuel (e.g., diesel, gasoline, etc.), as well as the same or different grade of fuel (e.g., low sulfur diesel, off road diesel, high/low octane gasoline, etc.).

In embodiments, the primary fuel supplied to burner 102 is the same fuel as the secondary and/or tertiary fuel added to the exhaust gas stream, e.g., via one or more supplemental fuel inlets. The secondary and tertiary fuels may also be the same or different, such that the same or different fuel(s) are supplied to distinct supplemental fuel inlets. For example, a secondary fuel may be supplied to a first (e.g., hot) supplemental fuel inlet, and a tertiary fuel that is the same or different from the secondary fuel may be supplied to a second (e.g. cool) supplemental fuel inlet. The type and amount of secondary and/or tertiary fuel utilized and the location at which it is added into the exhaust stream may be selected to achieve an exhaust stream that includes a target hydrocarbon speciation profile and/or a target total hydrocarbon concentration.

The term "hydrocarbon speciation profile" is used herein to refer to the type of hydrocarbon compounds that are present in an exhaust gas stream, e.g., flowing through exhaust pipe 106. As noted previously the type and amount of hydrocarbon compounds produced by the combustion of primary fuel may be determined by the combustion conditions (stoichiometry), the type of primary fuel combusted, and other factors. In some instances, combustion of primary fuel may produce an exhaust gas stream with a hydrocarbon speciation profile that accurately represents the hydrocarbon speciation profile of exhaust that may be produced by an engine. In many instances, however, the hydrocarbon speciation profile of exhaust gas produced by the combustion of primary fuel alone may differ from the hydrocarbon speciation profile of exhaust gas produced by a combustion engine or other piece of equipment.

For example, the hydrocarbon speciation profile produced by the combustion of primary fuel by burner 102 may produce an exhaust gas in which the relative amounts of short and/or long chain hydrocarbons differ from the amount of such compounds in exhaust produced by an engine by more than a threshold amount (e.g., greater than or equal to about 5%). Similarly, combustion of primary fuel by burner 102 may produce exhaust that has a total hydrocarbon concentration that differs from the total hydrocarbon concentration of exhaust produced by an engine by more than a threshold amount (e.g., greater than or equal to about 5%). With that in mind, exhaust gas generator 100 is configured to enable an operator to correct for the differences in THC and HCSP produced by combustion of primary fuel and the THC and HCSP in an exhaust gas stream produced by a real-world engine. For example and as will be discussed below, the THC and/or hydrocarbon speciation in the exhaust gas stream may be adjusted by adding supplemental fuel into the exhaust gas stream at one or more points along exhaust pipe 106.

Exhaust pipe 106 is configured such that at least two exhaust gas temperature zones are present within exhaust pipe 106 prior to the discharge of the exhaust gas stream out of exhaust gas generator 100. For the sake of illustration the present disclosure will focus on embodiments in which two exhaust gas temperature zones are present within exhaust gas pipe 106. In such embodiments a relatively hot exhaust gas temperature zone is present within exhaust pipe 106 at a location that is proximate to burner 102, and a relatively cool exhaust gas temperature region is present within exhaust gas pipe 106 in a region downstream of the hot exhaust gas temperature region. That concept is shown in FIG. 1, which depicts exhaust gas pipe 106 as including a relatively hot region 108 of exhaust gas proximate to burner 102, and a relatively cool region of exhaust gas 110 downstream of hot region 108. It should be understood that such an embodiment is for the sake of illustration only, and that more than two exhaust gas temperature regions may be present within exhaust gas pipe 106. For example, in some embodiments exhaust gas pipe 106 may be configured such that at least 2, 3, 4, 5, 6, 10 or more exhaust temperature regions are present within it prior to the discharge of exhaust gas from exhaust gas generator 100. Alternatively or additionally, exhaust gas pipe 106 may be configured such that the temperature of the exhaust gas gradually decreases with increased distance from burner 106, e.g., in a gradient or other profile.

In the illustrated embodiment the presence of hot and cool regions 108, 110 of the exhaust gas stream may be attributable to natural cooling of the exhaust gas following its emission from burner 102. It should be understood that the rate and which the exhaust gases cool may be passively or actively controlled and/or affected in various ways, which for the sake of clarity are not illustrated in the figure. For example exhaust gas generator 100 may include at least one heat exchanger (not shown) that is configured to cool all or a portion of the exhaust gas stream produced by burner 102. In embodiments, such a heat exchanger may be disposed around all or a portion of exhaust pipe 106, e.g., in a region between hot region 108 and cool region 110. Other mechanisms for actively or passively cooling the exhaust gas mechanisms may also be used.

Regardless of how the exhaust gas stream is cooled after its emission from burner 102, at least two exhaust gas temperature regions may be present within exhaust pipe 106. As noted above, more than two (e.g., three, four, five, or more) exhaust gas temperature regions may be used, with additional temperature zones allowing for finer control over the speciation of hydrocarbons in the exhaust gas stream. In some embodiments a hot region 108 and cool region 110 are used, as shown in FIG. 1. The hot region 108 may be a region within exhaust pipe 106 at which the temperature of the exhaust gas stream exceeds a first threshold temperature, whereas the cool region 110 may be a region within exhaust pipe 106 at which the temperature of the exhaust gas stream is less than the first threshold temperature. In embodiments the first threshold temperature is a temperature at which partial oxidation/thermal decomposition of secondary fuel occurs, resulting in the production of short chain hydrocarbon species. In some embodiments, the first threshold temperature is greater than or equal to 400 degrees Celsius (° C.), such as greater than or equal to 450° C., greater than or equal to 500° C., or even greater than or equal to 600° C.

As further shown in FIG. 1, exhaust gas generator 100 includes supplemental fuel inlets 118, 120, which for the sake of reference are also referred to herein as a hot fuel inlet 118 and cool fuel inlet 120. As will be described in further detail below, supplemental (e.g. secondary and/or tertiary) fuel may be added (e.g., injected) into the exhaust gas stream within the exhaust gas pipe via the hot fuel inlet 118 and/or the cool fuel inlet 120, respectively. The hot fuel inlet 118 is fluidly coupled to exhaust gas pipe 106, and is configured to enable the addition of supplemental (e.g., secondary) fuel from fuel supply 112 or another source into hot region 108 of the exhaust gas stream. In contrast the cool fuel inlet 120 is fluidly coupled to exhaust gas pipe 106 and is configured to enable the addition of supplemental (e.g., tertiary) fuel into cool region 110 of the exhaust gas stream. The type and amount of supplemental fuel that may be added into the exhaust gas stream via the hot fuel inlet 118 and the cool fuel inlet 120 is not practically limited. In embodiments the supplemental fuel is the same as or different from the primary fuel introduced into burner 102 via burner fuel inlet 104 as noted above. Likewise, the supplemental (e.g., secondary) fuel added into the hot fuel inlet 118 may be the same as or different from the supplemental (e.g. tertiary) fuel added into the cool fuel inlet.

In embodiments the supplemental fuel inlets (e.g., hot fuel inlet 118 and/or cool fuel inlet) are or include a fuel injector that is configured to inject supplemental fuel into exhaust pipe 106 via air assisted fuel injection, high pressure fuel injection, or a combination thereof. When used, such fuel injectors may be configured to introduce supplemental fuel into exhaust pipe 106 in atomized form. More specifically, the fuel injectors may be configured to atomize supplemental fuel such that droplets of supplemental fuel having a controlled size are introduced into exhaust pipe 106. In some embodiments the fuel injectors are configured to produce droplets of supplemental fuel with an average droplet size that is less than or equal to 100 microns, such as less than or equal to 50 microns. Other droplet sizes may also be used, and the droplet size may be controlled/tailored to facilitate the evaporation and/or decomposition of supplemental fuel within the exhaust gas stream.

Adjustment of the HS and/or THC within the exhaust gas stream produced by exhaust gas generator 100 may be achieved by controlling the type and relative amount of supplemental (e.g., secondary, tertiary, etc.) fuel introduced into the hot and/or cool regions 108, 110 via hot fuel inlet 118 and/or cool fuel inlet 120. For example, the concentration of short chain hydrocarbons in the exhaust gas stream produced by exhaust gas generator 100 may be increased by introducing supplemental fuel only into hot region 108 via hot fuel inlet 118, with the relative amount of adjustment in short chain hydrocarbons being related to the amount of supplemental fuel that is added. Alternatively, the concentration of long chain hydrocarbons in the exhaust gas stream produced by exhaust gas generator 100 may be increased by introducing supplemental (e.g., tertiary) fuel only into the cool region 110 via cool fuel inlet 120. Of course, supplemental fuel may be introduced into both the hot region 108 and the cool region 110 at the same time. Doing so will increase the overall hydrocarbon concentration in the exhaust gas stream, with the relative amount of short and long chain hydrocarbons in the exhaust gas stream being determined by a combination of the combustion conditions used to burn primary fuel in burner 102 (e.g., air fuel ratio), as well as the relative amount of supplemental fuel(s) added into the hot and cool regions 108, 110.

Additional control over the hydrocarbon concentration and/or speciation in the exhaust gas stream produced by exhaust gas generator 100 may be achieved by adding supplemental fuel that differs (e.g., in type or grade) from the primary fuel supplied to burner 102 into the hot and/or cool regions 108, 110. Likewise, additional control over the hydrocarbon concentration and/or speciation of the exhaust gas stream produced by exhaust gas generator 100 may be achieved by added different types and/or grades of supplemental fuel into the hot and cold regions 108, 110, respectively. That is, secondary and/or tertiary fuels may be added to the hot and cold fuel inlets 118, 120, respectively, wherein the secondary and tertiary fuels differ from one another.

In embodiments, exhaust gas generator 100 may be used to produce an exhaust gas stream that is representative of the exhaust gas stream produced by an engine at various operating conditions. To simulate low load conditions (where an engine may produce exhaust with dominant short chain (light) components), for example, supplemental fuel may be added into the exhaust gas stream via hot fuel inlet 118 to increase the concentration of short chain hydrocarbons in the exhaust gas stream produced by exhaust gas generator 100. On the other hand to simulate high load conditions (where an engine may produce exhaust with dominant long chain (heavy) components), supplemental fuel may be introduced into the exhaust gas stream via cool fuel inlet 120 so as to increase the concentration of long chain hydrocarbons in the exhaust gas stream. An exhaust gas stream produced by an engine during a transition between a low load to high load condition (or vice versa) may also be simulated by initially adding supplemental fuel only into the exhaust gas via hot fuel inlet 118, and then adding supplemental fuel only into cool fuel inlet 120, or vice versa.

In embodiments, at some point downstream of burner 102 dilution air may be introduced into the exhaust gas stream by an optional dilution air inlet. That concept is shown in FIG. 1, which depicts an optional dilution air inlet 109 that is fluidly coupled to exhaust gas pipe 106. For the sake of illustration dilution air inlet 109 is shown in FIG. 1 as being coupled to exhaust gas pipe 106 within cool region 110, but it should be understood that it may be coupled to the exhaust gas pipe 106 at another location. Regardless of its location, dilution air inlet 109 may be used to supply air or another gas (nitrogen, oxygen, etc.), e.g., for the purpose of further affecting the downstream composition of the exhaust gas stream.

As further shown in FIG. 1, exhaust gas generator 100 may include an optional oil inlet 122. The optional oil inlet 122 may be used to introduce lubricating oil (e.g., engine oil, in contrast to fuel) into the exhaust gas stream within exhaust gas pipe 106. The optional oil inlet 122 may include an injector that is configured to introduce the lubricating oil in the form of an atomized oil spray that includes oil droplets that are small enough to vaporize and decompose within the exhaust gas stream. The introduction of lubricating oil in that way may be used to cause the production of particulates within the exhaust gas stream, wherein the particulates are of a desired size and/or composition.

In the embodiment of FIG. 1 exhaust gas generator 100 includes a metering unit 116. In general, metering unit 116 is configured to control the supply of fuel to one or more of burner fuel inlet 104, hot fuel inlet 110, and/or cool fuel inlet 120. The metering unit 116 may include one or a plurality of fuel pumps (not shown), each of which may be used to provide fuel from fuel supply 112 to one or more of burner inlet 104, hot fuel inlet 118, and/or cool fuel inlet 120. In some embodiments, metering unit 116 includes at least one fuel pump for each fuel inlet. In further embodiments, metering unit 116 (and/or the fuel pumps therein) may be electronically controlled. In such instances metering unit 116 may be configured such that in response to control signals from controller 114, it supplies an appropriate amount of primary fuel to burner fuel inlet 104 and supplemental fuel to hot fuel inlet 118 and/or cool fuel inlet 120. In instances where the primary and supplemental fuels are the same, metering unit (or the fuel pump(s) therein) may be coupled to a single supply of fuel, such as fuel supply 112 as shown in FIG. 1. Of course such a configuration is not necessary, and metering unit may be fluidly coupled to multiple fuel sources. Alternatively, fuel supply 112 may include multiple fuel reservoirs that include multiple different types and/or grades of fuel, with appropriate connections to burner fuel inlet 104, hot fuel inlet 118, and/or cool fuel inlet 120.

Controller 114 is configured to control the operating parameters of exhaust generation exhaust gas generator 100, such as the operating parameters of burner 102 (e.g., ignition, air assist to the fuel injector, primary fuel feed, blower air feed), and other operating parameters such as supplemental fuel feed to hot fuel inlet 118, supplemental fuel feed to cool fuel inlet 120, optional auxiliary air feed (e.g., from optional dilution air inlet 109), optional oil feed (from optional oil inlet 122) combinations thereof, and the like. One example of a controller 114 is the processor based controller shown and described in conjunction with FIG. 2 herein.

In embodiments, controller 114 may be in communication with various sensors (not shown). Such sensors may collect and report test data representing various operating conditions of exhaust gas generator 100. For example, such sensors may collect test data regarding the mass air flow in the system, the air/fuel ratio (e.g., linear and exhaust gas oxygen (EGO)), the exhaust gas temperature at various points within exhaust gas pipe 106 (e.g., in hot region 108 and cool region 110), combinations thereof, and the like.

In some embodiments, controller 114 may be in communication with a downstream gas analyzer. That concept is shown in FIG. 1, which depicts controller 114 as being communicatively coupled to optional analyzer 124. In embodiments, optional analyzer 124 may be a gas analyzer that is configured to measure hydrocarbon speciation and/or total hydrocarbon concentration within the exhaust gas stream produced by exhaust gas generator 100. In such instances controller 114 may receive data signals from optional analyzer 124, wherein the data signals contain test data regarding the hydrocarbon speciation and/or total hydrocarbon concentration of the exhaust gas stream as measured by optional analyzer 124. In response to such signals, the controller 114 may compare the measured total hydrocarbon concentration (MTHC) and/or measured hydrocarbon speciation profile (MHSP) against a target total hydrocarbon concentration (TTHC) and/or a target hydrocarbon speciation profile (THSP). If the reported MTHC and/or MHS do not match a desired target (i.e., they differ from the MTHC and/or MHSP by greater than a threshold amount), controller 114 may adjust various parameters of the exhaust gas generator 100 in an effort to achieve the target. For example, in some embodiments controller 114 may increase or decrease the amount of supplemental fuel fed to hot fuel inlet 118 and/or cool fuel inlet 120, so as to achieve a target total hydrocarbon concentration, a target hydrocarbon speciation, or both. Alternatively or additionally, controller 114 may adjust other operating parameters of exhaust gas generator 100, such as the operating parameters of burner 102.

The target THSP may span a wide range of speciation profiles. For example, the THSP may specify a THSP that includes from about 10% to about 90% short chain hydrocarbons, and from about 90% to about 10% long chain hydrocarbons. To achieve the THSP, the controller 114 may cause burner 102 to combust primary fuel at a first set of combustion parameters to generate an exhaust gas. An analyzer may measure the hydrocarbon speciation in the exhaust gas and transmit a signal containing the result of that measurement to the controller 114. In response to the signal, the controller 114 may compare the measured hydrocarbon speciation to the THSP and, if the measured hydrocarbon speciation differs from the THSP (e.g., by greater than a threshold amount), adjust the operating parameters of burner 102 and/or cause the metering of supplemental fuel into the exhaust pipe, so as to adjust the hydrocarbon speciation of the exhaust gas to the THSP.

Of course controller 114 need not be in communication with a gas analyzer or other sensors. Indeed, in some embodiments controller 114 may include calibration data (e.g., in the form of a database or other data structure) that includes operating parameters for exhaust gas generator 100 at which certain exhaust gas conditions (THC, HS) may be achieved with one or more primary and/or secondary fuels. In such embodiments, optional analyzer 124 (or other sensors) may be omitted and controller 114 may simply adjust the operating parameters of exhaust gas generator 100 based on the calibration data.

Figure 2:
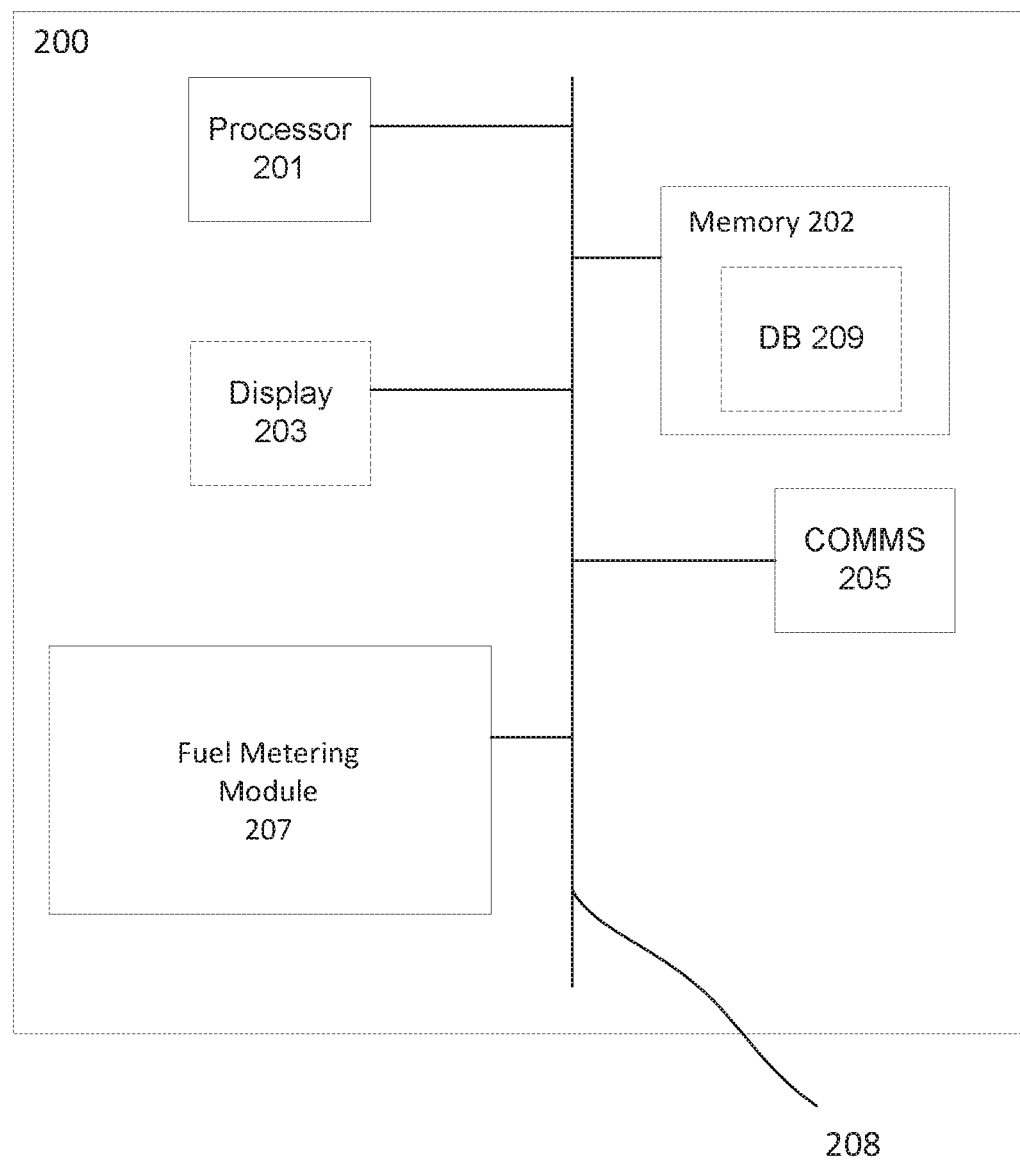
FIG. 2 is a block diagram of a controller for a burner based exhaust generator consistent with the present disclosure.

FIG. 2 is a block diagram of one example of a controller for a burner based exhaust generator consistent with the present disclosure. As shown, controller 114 includes device platform 200, processor 201, memory 202, optional display 203, communications resources (COMMS) 205, fuel metering module (FMM) 207. Such components may be communicatively coupled with one another by bus 208, which may be any suitable electronic bus. In some embodiments controller 200 is implemented in and/or is in the form of one or more electronic devices, such as but not limited to any kind of mobile device and/or stationary device, such as a control panel, computer terminal, desktop computer, kiosks, netbook computer, notebook computer, internet device, personal digital assistant, server, smart phone, tablet personal computer, ultra-mobile personal computer, wired telephone, combinations thereof, and the like. Without limitation, in some embodiments controller 114 is in the form of a smart phone, a laptop computer, a desktop computer, a tablet computer, a kiosk, a control panel, combinations thereof, and the like.

For ease of illustration and understanding the specification describes and the FIGS. 1 and 2 depict controller 114 as implemented in or with a single electronic device that is integral with exhaust gas generator 100. It should be understood that such description and illustration is for the sake of example only and that the various elements and functions described herein may be distributed among and performed by any suitable number of devices. For example, the present disclosure envisions embodiments in which controller 114 is separate from other components of exhaust gas generator 100, and is configure to perform control operations consistent with the present disclosure. While embodiments described herein utilize a single controller to control multiple devices, it should be understood that the functions of controller 114 may be distributed among a plurality of different devices, as desired. For example, in embodiments a first controller may be employed to control the operation of burner 102 and the metering of primary fuel thereto via burner fuel inlet 104, and one or more additional controllers may be used to individually or collectively control the addition of supplemental fuel into the exhaust gas stream via hot fuel inlet 118 and/or cool fuel inlet 120.

Device platform 200 may be any suitable device platform, and in some embodiments correlates to the type of electronic device that is used as controller 114. For example where controller 114 is implemented in a control panel, smart phone, desktop computer, laptop computer, etc., device platform 200 may be a control panel platform, smart phone platform, desktop computer platform, laptop computer platform, etc. respectively.

Regardless of its nature, device platform 200 may include processor 201, memory 202, and communications resources (COMMS) 205. Processor 201 may be any suitable general purpose processor or application specific integrated circuit, and may be capable of executing one or multiple threads on one or multiple processor cores. Without limitation, in some embodiments processor 102 is a general-purpose processor, such as but not limited to the general purpose processors commercially available from INTEL® Corp., ADVANCED MICRO DEVICES®, ARM®, NVIDIA®, APPLE®, and SAMSUNG®. It should be understood that while FIG. 2 illustrates device platform 200 as including a single processor 201, multiple processors may be used.

Memory 202 may be any suitable type of computer readable memory. Exemplary memory types that may be used as memory 202 include but are not limited to: semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, memory 202 may include other and/or later-developed types of computer-readable memory.

Optional display 203 may provide an interface for the presentation of control information to a user. In some embodiments, optional display 203 is a liquid crystal or other display. Alternatively or additionally, optional display 203 may be in the form of or include a touch screen display, in which case optional display 203 may be configured to provide a user interface (e.g., a touch interface) through which a user may adjust various operating parameters of controller 114 and/or exhaust gas generator 100. In embodiments, controller 114 may lack a display (in which case optional display 203 may be omitted, and/or may be coupled to a display that is not integral with device platform 200.

COMMS 205 may include hardware (i.e., circuitry), software, or a combination of hardware and software that is configured to allow controller 114 to receive and/or transmit data or other communications. For example, COMMs 205 may be configured to enable controller 114 to receive one or more data signals from one or more sensors, such as but not limited to optional analyzer 114 and/or one or more other sensors (e.g., sensors detecting the operation of blower 101 or burner 102, exhaust gas temperature sensors to sense the temperature of exhaust within hot region 108 and/or cool region 110, etc.). For example, COMMS 205 may facilitate communications over a wired or wireless communications link (not shown) between exhaust gas generator 100 and another device, such as optional analyzer 124, one or more other sensors, another computer system (e.g., a third-party computer and/or server), combinations thereof, and the like. COMMS 205 may also facilitate communication between controller 114 and various components of exhaust gas generator 100, such as blow 101, burner 102, metering unit 116, fuel supply 112, etc. COMMS 205 may therefore include hardware to support wired and/or wireless communication, e.g., one or more transponders, antennas, BLUETOOTH™ chips, personal area network chips, near field communication chips, wired and/or wireless network interface circuitry, combinations thereof, and the like. Such communication may occur using one or more previously developed, current, or future developed wired or wireless communications standards.

Fuel metering module (FMM) 207 may include hardware, software, or a combination of hardware and software that is configured to perform or cause the performance of control operations consistent with the present disclosure. More specifically, in some embodiments FMM 207 may be in the form of logic implemented at least in part in hardware to perform various control operations, such as controlling the operation of burner 102, controlling the metering of primary and secondary fuel, analyzing sensor data (e.g., received from optional analyzer 124), combinations thereof, and the like. For example, in some embodiments FMM 207 may be configured to compare a measured hydrocarbon speciation profile (MHSP) and/or measured total hydrocarbon concentration (MTHC) reported in a sensor signal from at least one sensor (e.g., optional gas analyzer 124) against a target hydrocarbon speciation profile (THSP) and/or a target total hydrocarbon concentration (TTHC), which may be stored in memory 202, e.g., in optional database 209 or another suitable data structure. When the MTHS and/or MTHC equals a respective target, or is within a threshold range (e.g., +/−5%, 2.5%, or even 1%) of the target, FMM 207 may be configured to maintain the operating parameters of exhaust gas generator 100 at current values. When the MHSP and/or MTHC is outside the threshold range of the target, FMM 207 may cause controller 114 to adjust one or more parameters of exhaust gas generator 100, such as but not limited to the operating parameters of burner 102, the feed rate of primary fuel 104, feed rate of supplemental fuel into hot fuel inlet 118 and/or cool fuel inlet 120, combinations thereof, and the like.

FMM 207 may dynamically adjust one or more operating parameters of exhaust gas generator 100 in an effort to achieve a set of operating parameters that produce an exhaust gas stream that includes a MHSP and/or MTHC that equals or is within a threshold range of a THSP or TTHC. Alternatively or additionally, adjustment of the operating parameters of exhaust gas generator 100 may be based on predetermined calibration parameters that may be stored in memory 202 or in a remote location.

Figure 3:
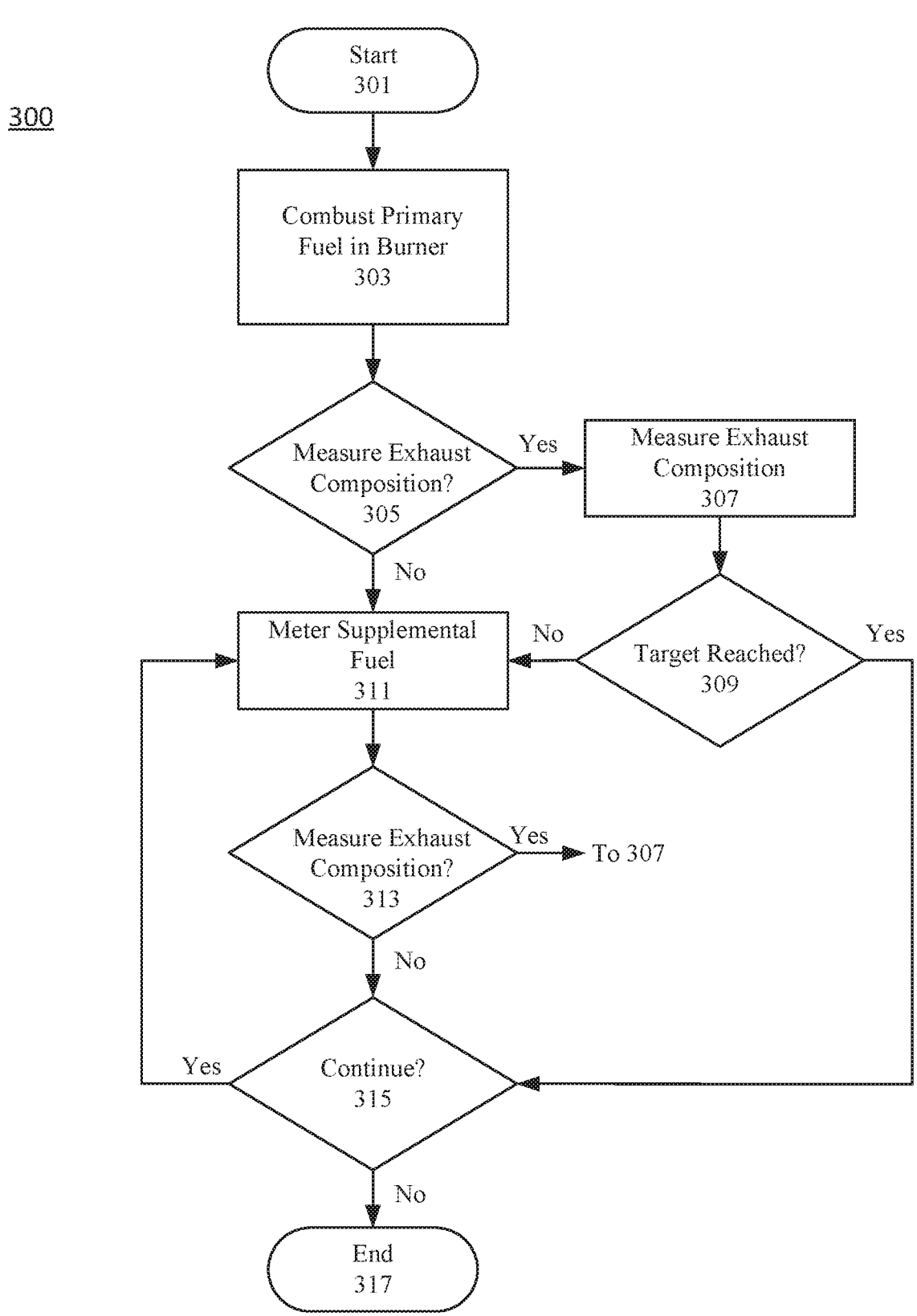
FIG. 3 is a flow chart of example operations of one example of a method of producing an exhaust gas consistent with the present disclosure.

Another aspect of the present disclosure relates to methods of producing an exhaust gas stream with controlled hydrocarbon speciation. In that regard reference is made to FIG. 3, which is a flow diagram of example operations of one example of a method of producing an exhaust gas stream consistent with the present disclosure.

As shown, method 300 begins at block 301. The method may then advance to block 303, pursuant to which primary fuel may be combusted in a burner. Combustion of the primary fuel may occur using a set of predetermined burner operating parameters, including but not limited to a predetermined fuel/air ratio. The method may the proceed to block 305, pursuant to which a determination may be made as to whether the composition of the exhaust gas stream produced by the combustion of primary fuel is to be measured. Such a measurement may be conditioned, for example, on the presence or absence of equipment that is capable of determining the hydrocarbon species that are present in the exhaust gas stream.

If measurement of the composition of the exhaust is to be measured the method may proceed to block 307, pursuant to which the composition of the exhaust is measured, e.g., with a gas analyzer (e.g., optional analyzer 124). The method may then proceed to block 309, pursuant to which a determination may be made as to whether the measured composition of the exhaust gas stream equals or is within a threshold range of a target/threshold, as previously discussed. If so, the method may proceed to block 315, but if not (or if the outcome of block 305 is NO), the method may proceed to block 311. It is noted that the outcome of block 305 may be no in instances where operating parameters that are known to produce desired results (e.g., calibration data) may be available, in which case measurement of the exhaust stream composition may not be necessary or desired.

In any case, pursuant to block 311 supplemental fuel may be metered (added) into hot fuel inlet 118 and/or cool fuel inlet 120, so as to adjust the speciation and/or total concentration of hydrocarbons within the exhaust gas stream. For example in instances where it is desired to increase the concentration of short chain hydrocarbons in the exhaust gas stream, supplemental fuel may be metered pursuant to block 311 into hot fuel inlet 118. Conversely where it is desired to increase the concentration of long chain hydrocarbons in the exhaust gas stream, supplemental fuel may be metered pursuant to block 311 into cool fuel inlet 120. Still further, where it is desired to increase the total hydrocarbon concentration in the exhaust gas stream (with or without affecting the ratio of short/long chain hydrocarbon species), supplemental fuel may be metered pursuant to block 311 into both the hot fuel inlet 118 and the cool fuel inlet 120.

Similar adjustments/metering may be made when multiple different types/grades of supplemental fuel are available for addition to the exhaust gas stream.

Following block 311 the method may proceed to block 313, pursuant to which a determination may be made as to whether the composition of the exhaust gas stream is to be measured. If so the method may loop back to block 307 and continue, but if not (e.g., where measurement of the exhaust gas stream is not desired or appropriate measurement equipment is not available), the method may proceed to block 315. Pursuant to block 315 a determination may be made as to whether the method is to continue. If so the method may loop back to block 311 and continue, but if not the method may proceed to block 317 and end.

EXAMPLES

The following examples pertain to additional embodiments of the present disclosure.

Example 1: According to this example there is provided an apparatus for producing exhaust gas, including: a burner coupled to a burner fuel inlet; an exhaust pipe coupled to the burner; a hot fuel inlet coupled to the exhaust gas pipe; and a cool fuel inlet coupled to the exhaust gas pipe downstream of the hot fuel inlet; wherein: the burner is configured to produce an exhaust gas stream with a first hydrocarbon speciation profile by combusting primary fuel provided via the burner fuel inlet; the exhaust gas pipe is configured to receive the exhaust gas stream; at least first and second exhaust gas temperature regions are present within the exhaust gas pipe when the primary fuel is combusted; the hot fuel inlet is configured to deliver a first supplemental fuel into the exhaust gas stream within a portion of the exhaust gas pipe corresponding to the first exhaust gas temperature region; the cool fuel inlet is configured to deliver a second supplemental fuel into the exhaust gas stream within a portion of the exhaust gas pipe corresponding to the second exhaust gas temperature; and addition of the first supplemental fuel, second supplemental fuel, or a combination of the first and second supplemental fuels into the exhaust gas stream adjusts the first hydrocarbon speciation profile to a second, different hydrocarbon speciation profile.

Example 2: This example includes any or all of the features of example 1, wherein the first supplemental fuel, the second supplemental fuel, or both the first and second supplemental fuels are the same as or different from the primary fuel.

Example 3: This example includes any or all of the features of example 2, wherein the first and second supplemental fuels are the same or different from one another.

Example 4: This example includes any or all of the features of example 1, and further includes a metering unit fluidly coupled to at least the hot fuel inlet and the cool fuel inlet, wherein the metering unit is configured to add the first supplemental fuel to the hot fuel inlet and to add the second supplemental fuel to the cool fuel inlet.

Example 5: This example includes any or all of the features of example 4, and further includes a controller, wherein: the controller is configured to transmit at least one control signal to the metering unit, the at least one control signal configured to cause the metering unit to adjust a flow of one or more of the first supplemental fuel to the hot fuel inlet and a flow of the second supplemental fuel to the cool fuel inlet so as to adjust the first hydrocarbon speciation profile such that the second hydrocarbon speciation profile is within a threshold range of the target hydrocarbon speciation profile.

Example 6: This example includes any or all of the features of example 5, and further includes at least one sensor, wherein: the at least one sensor is configured to transmit at least one data signal including test data to the controller; and the controller is to configure the control signal based at least in part on the test data in the at least one data signal.

Example 7: This example includes any or all of the features of example 6, wherein: the test data includes a measured hydrocarbon speciation profile obtained from the exhaust gas stream downstream of the cool fuel inlet; the controller is configured to compare the measured hydrocarbon speciation profile to a target hydrocarbon speciation profile and, when the measured hydrocarbon speciation is outside the threshold range of the target hydrocarbon speciation profile, to cause the metering unit to adjust the flow of the secondary fuel, the flow of the tertiary fuel, or the flow of both the secondary fuel and the tertiary fuel.

Example 8: This example includes any or all of the features of example 1, wherein the first exhaust gas temperature region is hotter than the second exhaust gas temperature region.

Example 9: This example includes any or all of the features of example 8, wherein the first exhaust temperature region has a temperature $T1$ that is greater than or equal to about 400 degrees Celsius.

Example 10: This example includes any or all of the features of example 8, wherein $T1$ is greater than or equal to about 500 degrees Celsius.

Example 11: This example includes any or all of the features of example 10, wherein $T1$ is greater than or equal to about 600 degrees Celsius.

Example 12: According to this example there is provided a method of producing an exhaust gas, including: combusting a primary fuel in a burner so as to produce an exhaust gas stream with a first hydrocarbon speciation profile within an exhaust gas pipe, wherein at least first and second exhaust gas temperature regions are present within the exhaust gas pipe;

adjusting the first hydrocarbon speciation profile to a second, different hydrocarbon speciation profile at least in part by adding a first supplemental fuel into the into the exhaust gas pipe within the first exhaust gas temperature region, adding a second supplemental fuel into the exhaust gas pipe within the second exhaust gas temperature region, or adding first and second supplemental fuel to the exhaust gas pipe within the first and second exhaust gas temperature regions, respectively.

Example 13: This example includes any or all of the features of example 12, wherein the first supplemental fuel, the second supplemental fuel, or both the first and second supplemental fuels are the same as or different from the primary fuel.

Example 14: This example includes any or all of the features of example 13, wherein the first supplemental fuel and the second supplemental fuel are the same or different from one another.

Example 15: This example includes any or all of the features of example 12, wherein adding the first supplemental fuel, adding the second supplemental fuel, or adding both the first and secondary supplemental fuels is performed with a metering unit.

Example 16: This example includes any or all of the features of example 15, wherein the second hydrocarbon speciation profile is a target hydrocarbon speciation profile, and the method further includes: transmitting, with a controller, at least one control signal to the metering unit, wherein the at least one control signal is configured to cause the metering unit to adjust an amount of one or a more of an amount of first supplemental fuel added into the exhaust pipe, an amount of second supplemental fuel added into the exhaust pipe, or to adjust an amount of both the first and second supplemental fuels added into the exhaust pipe, so as to adjust the first hydrocarbon speciation profile to within the threshold range of the target hydrocarbon speciation profile.

Example 17: This example includes any or all of the features of example 16, and further includes: receiving, with the controller, at least one data signal including test data measured by at least one sensor; and configuring, with the controller, the at least one control signal based at least in part on the test data.

Example 18: This example includes any or all of the features of example 17, wherein the test data includes a measured hydrocarbon speciation profile obtained from the exhaust gas stream downstream of the cool fuel inlet, and the method further includes: with the controller: comparing the measured hydrocarbon speciation profile to the target hydrocarbon speciation profile; and when the measured hydrocarbon speciation is outside the threshold range of the target hydrocarbon speciation profile, configuring the at least one control signal to cause the metering unit to adjust the flow of the first supplemental fuel, the flow of the second supplemental fuel, or the flow of both the first and the secondary supplemental fuels.

Example 19: This example includes any or all of the features of example 12, wherein the first exhaust gas temperature region is hotter than the second exhaust gas temperature region.

Example 20: This example includes any or all of the features of example 19, wherein the first exhaust temperature region has a temperature $T1$ that is greater than or equal to about 400 degrees Celsius.

Example 21: This example includes any or all of the features of example 20, wherein $T1$ is greater than or equal to about 500 degrees Celsius.

Example 22: This example includes any or all of the features of example 21, wherein $T1$ is greater than or equal to about 600 degrees Celsius.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method of producing an exhaust gas, comprising:
   drawing ambient air into a blower and exhausting a pressurized stream of the ambient air from the blower to a burner;
   combusting a primary fuel and the ambient air in the burner so as to produce an exhaust gas stream with a first hydrocarbon speciation profile within an exhaust gas pipe, wherein at least first and second exhaust gas temperature regions are present within the exhaust gas pipe;
   adjusting the first hydrocarbon speciation profile to a second, different hydrocarbon speciation profile at least in part by adding a first supplemental fuel into the exhaust gas pipe within the first exhaust gas temperature region, adding a second supplemental fuel into the exhaust gas pipe within the second exhaust gas temperature region, or adding first and second supplemental fuel to the exhaust gas pipe within the first and second exhaust gas temperature regions, respectively;
wherein adding said first supplemental fuel, adding said second supplemental fuel, or adding both said first and secondary supplemental fuels is performed with a metering unit; and
wherein the second hydrocarbon speciation profile is a target hydrocarbon speciation profile, and the method further comprises transmitting, with a controller, at least one control signal to the metering unit, wherein the at least one control signal is configured to cause the metering unit to adjust an amount of one or a more of an amount of first supplemental fuel added into the exhaust pipe, an amount of second supplemental fuel added into the exhaust pipe, or to adjust an amount of both the first and second supplemental fuels added into the exhaust pipe, so as to adjust the first hydrocarbon speciation profile to within the threshold range of the target hydrocarbon speciation profile.

2. The method of claim 1, wherein the first supplemental fuel, the second supplemental fuel, or both the first and second supplemental fuels are the same as or different from the primary fuel.

3. The method of claim 2, wherein the first supplemental fuel and the second supplemental fuel are the same or different from one another.

4. The method of claim 1, further comprising:
receiving, with the controller, at least one data signal comprising test data measured by at least one sensor; and
configuring, with the controller, the at least one control signal based at least in part on the test data.

5. The method of claim 4, wherein the test data includes a measured hydrocarbon speciation profile obtained from the exhaust gas stream downstream of the cool fuel inlet, and the method further comprises:
with the controller,
comparing the measured hydrocarbon speciation profile to the target hydrocarbon speciation profile; and
when said measured hydrocarbon speciation is outside the threshold range of the target hydrocarbon speciation profile, configuring the at least one control signal to cause the metering unit to adjust the flow of said first supplemental fuel, the flow of said second supplemental fuel, or the flow of both said first and said secondary supplemental fuels.

6. The method of claim 1, wherein the first exhaust gas temperature region is hotter than the second exhaust gas temperature region.

7. The method of claim 6, wherein the first exhaust temperature region has a temperature T1 that is greater than or equal to 400 degrees Celsius.

8. The method of claim 7, wherein T1 is greater than or equal to 500 degrees Celsius.

9. The method of claim 8, wherein T1 is greater than or equal to 600 degrees Celsius.

10. A method of producing an exhaust gas, comprising:
combusting a primary fuel in a burner so as to produce an exhaust gas stream with a first hydrocarbon speciation profile within an exhaust gas pipe, wherein at least first and second exhaust gas temperature regions are present within the exhaust gas pipe;
adjusting the first hydrocarbon speciation profile to a second, different hydrocarbon speciation profile at least in part by adding a first supplemental fuel into the into the exhaust gas pipe within the first exhaust gas temperature region, adding a second supplemental fuel into the exhaust gas pipe within the second exhaust gas temperature region, or adding first and second supplemental fuel to the exhaust gas pipe within the first and second exhaust gas temperature regions, respectively;
wherein adding said first supplemental fuel, adding said second supplemental fuel, or adding both said first and secondary supplemental fuels is performed with a metering unit;
wherein the second hydrocarbon speciation profile is a target hydrocarbon speciation profile; and
transmitting, with a controller, at least one control signal to the metering unit, wherein the at least one control signal is configured to cause the metering unit to adjust an amount of one or a more of an amount of first supplemental fuel added into the exhaust pipe, an amount of second supplemental fuel added into the exhaust pipe, or to adjust an amount of both the first and second supplemental fuels added into the exhaust pipe, so as to adjust the first hydrocarbon speciation profile to within a threshold range of the target hydrocarbon speciation profile.

11. The method of claim 10, wherein the first supplemental fuel, the second supplemental fuel, or both the first and second supplemental fuels are the same as or different from the primary fuel.

12. The method of claim 11, wherein the first supplemental fuel and the second supplemental fuel are the same or different from one another.

13. The method of claim 10, further comprising:
receiving, with the controller, at least one data signal comprising test data measured by at least one sensor; and
configuring, with the controller, the at least one control signal based at least in part on the test data.

14. The method of claim 13, wherein the test data includes a measured hydrocarbon speciation profile obtained from the exhaust gas stream downstream of the cool fuel inlet, and the method further comprises:
with the controller,
comparing the measured hydrocarbon speciation profile to the target hydrocarbon speciation profile; and
when said measured hydrocarbon speciation is outside the threshold range of the target hydrocarbon speciation profile, configuring the at least one control signal to cause the metering unit to adjust the flow of said first supplemental fuel, the flow of said second supplemental fuel, or the flow of both said first and said secondary supplemental fuels.

15. The method of claim 10, wherein the first exhaust gas temperature region is hotter than the second exhaust gas temperature region.

16. The method of claim 15, wherein the first exhaust temperature region has a temperature T1 that is greater than or equal to 400 degrees Celsius.

17. The method of claim 16, wherein T1 is greater than or equal to 500 degrees Celsius.

18. A method of producing an exhaust gas, comprising:
combusting a primary fuel, with ambient air from a blower, in a burner of a burner-based exhaust generator so as to produce an exhaust gas stream without use of an internal combustion engine, the exhaust gas stream having a first hydrocarbon speciation profile within an exhaust gas pipe, wherein at least first and second exhaust gas temperature regions are present within the exhaust gas pipe;

adjusting the first hydrocarbon speciation profile to a second, different hydrocarbon speciation profile at least in part by adding a first supplemental fuel into the into the exhaust gas pipe within the first exhaust gas temperature region, adding a second supplemental fuel into the exhaust gas pipe within the second exhaust gas temperature region, or adding first and second supplemental fuel to the exhaust gas pipe within the first and second exhaust gas temperature regions, respectively.

* * * * *